United States Patent
Kim et al.

(10) Patent No.: US 8,847,757 B2
(45) Date of Patent: Sep. 30, 2014

(54) MOBILE DEVICE HAVING PROXIMITY SENSOR AND DATA OUTPUT METHOD USING THE SAME

(75) Inventors: Eun Ji Kim, Suwon-si (KR); Byung Sung Kim, Anyang-si (KR); Myoung Ji Nam, Seoul (KR); Tae Ho Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 487 days.

(21) Appl. No.: 12/791,258

(22) Filed: Jun. 1, 2010

(65) Prior Publication Data

US 2010/0308958 A1   Dec. 9, 2010

(30) Foreign Application Priority Data

Jun. 3, 2009 (KR) .................. 10-2009-0049016

(51) Int. Cl.
G05B 19/00 (2006.01)
G06F 3/01 (2006.01)
H04M 1/60 (2006.01)
H04M 1/725 (2006.01)

(52) U.S. Cl.
CPC ........... *G06F 3/017* (2013.01); *H04M 1/72558* (2013.01); *H04M 1/60* (2013.01); *H04M 2250/12* (2013.01); *H04M 1/72522* (2013.01)
USPC ........ 340/556; 345/156; 455/67.11; 455/574; 84/602

(58) Field of Classification Search
USPC ............... 340/5.1, 628, 539.11, 522, 545.3; 345/156, 556, 175; 455/67.11, 41.2, 455/574; 84/602, 647, 666, 667
See application file for complete search history.

(56) References Cited

U.S. PATENT DOCUMENTS

| | | | | |
|---|---|---|---|---|
| 5,684,294 A | * | 11/1997 | Kouhi ...................... | 250/214 AL |
| 6,011,212 A | * | 1/2000 | Rigopulos et al. .............. | 84/667 |
| 6,489,550 B1 | * | 12/2002 | Takahashi et al. .............. | 84/724 |
| 2010/0150399 A1 | * | 6/2010 | Svajda et al. ................. | 382/103 |

* cited by examiner

*Primary Examiner* — Nabil Syed
(74) *Attorney, Agent, or Firm* — Jefferson IP Law, LLP (57) ABSTRACT

A method for outputting data by using a proximity sensor in a mobile device is provided. The method includes emitting light in a proximity sensing mode and detecting light reflected by a gesture, processing a signal of the detected light, comparing the processed signal with a preset value, providing comparison data based on the compared signal with the preset value, and outputting data converted based on a result of analyzing the comparison data.

32 Claims, 9 Drawing Sheets

MOBILE DEVICE HAVING PROXIMITY SENSOR AND DATA OUTPUT METHOD USING THE SAME

PRIORITY

This application claims the benefit under 35 U.S.C. §119 (a) of a Korean patent application filed on Jun. 3, 2009 in the Korean Intellectual Property Office and assigned Serial No. 10-2009-0049016, the entire disclosure of which is hereby incorporated by reference.

BACKGROUND OF THE INVENTION

1. Field of the Invention

The present invention relates to a mobile device. More particularly, the present invention relates to a mobile device having a proximity sensor and a method for distinctively outputting data according to the strength of light and direction of a user's gesture detected by the proximity sensor.

2. Description of the Related Art

With the dramatic advance of modern scientific techniques, a variety of mobile devices have been developed and introduced. Moreover, rapid advances in mobile communication technologies provide traditional mobile devices with many useful applications that meet customer's demands. For example, in addition to a call function, other useful functions and services, such as a camera function, a digital broadcasting service, a wireless internet service, a Short Message Service (SMS), a Multimedia Message Service (MMS) and the like have been provided to mobile devices. More particularly, such functions and services are now expanding into various additional, personalized and specialized services.

An example of additional services is a music play service. The music play service allows a user to play a music file by using a function of musical instruments offered by the mobile device. However, a conventional mobile device does not support a function of outputting song data of a music file according to the strength of light or direction of a user's gesture after a proximity sensor detects light reflected by obstacles such as a user's hand. Specifically, a conventional mobile device does not output song data of a music file based on recognition of variations in a user's motion by a proximity sensor.

Therefore, a need exists for a mobile device for outputting data based on the strength of light and direction of a user's gesture.

SUMMARY OF THE INVENTION

An aspect of the present invention is to address at least the above-mentioned problems and/or disadvantages and to provide at least the advantages described below. Accordingly, an aspect of the present invention is to provide a mobile device and method for detecting light through a proximity sensor in a function of playing musical instruments and for outputting song data in different volumes based on the strength of detected light.

Another aspect of the present invention is to provide a mobile device and method for detecting light through a proximity sensor in a function of playing musical instruments and for outputting song data in different timbres based on direction of a user's gesture.

In accordance with an aspect of the present invention, a method for outputting data by using a proximity sensor of a mobile device is provided. The method includes emitting light and detecting light reflected by a gesture, processing a signal of the detected light, comparing the processed signal with a preset value, providing comparison data based on the compared signal with the preset value; and outputting data converted based on a result of analyzing the comparison data.

In accordance with another aspect of the present invention, a mobile device is provided. The device includes a proximity sensor unit including an emitting unit for emitting light and at least one receiving unit for detecting light reflected by a gesture, a signal processing unit for processing a signal of the detected light, and for providing comparison data by comparing the processed signal with a preset value, and a control unit for analyzing the comparison data received from the signal processing unit, and for outputting data converted based on a result of the analyzing of the comparison data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modification of the embodiments can be made with departing from the spirit and scope of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Among terms set forth herein, data denote information processed in and output from a mobile device. More particularly, according to an exemplary embodiment of the present invention, data includes song data to be output by means of a function of playing musical instruments in a mobile device. In this case, song data refers to a sound sequence in specific music selected by a user when a function of playing musical instruments is executed in a mobile device. Such specific music may be downloaded from content providers or preset during manufacture of a mobile device. Song data may have distinctive timbres which are classified into a high-pitched tone, a normal tone, and a low-pitched tone according to their frequencies. More particularly, song data may be output as normal tone, based on the strength of light, and also may be output as the high-pitched tone or the low-pitched tone, based on direction of a user's gesture. More specifically, a mobile device performs a signal processing for light detected through a proximity sensor and may, based on the strength of light, output pre-established song data or volume-adjusted song data. Also, after signal processing of the detected light, a mobile device may output timbre-adjusted song data, based on the direction of a user's gesture.

Although song data is described below in exemplary embodiments of the present invention, the present invention is not limited thereto. Accordingly, various types of data may also be applied to the present invention.

According to an exemplary embodiment of the present invention, a mobile device may have two modes of data output when detecting a user's gesture through a proximity sensor. One mode is to output data according to the strength of light, and another mode is to output data according to the direction of a user's gesture detected through a plurality of receiving units. Additionally, a mobile device may precisely detect a user's gesture by using two modes together during a proximity sensing.

In the first mode of data output based on the strength of light, a mobile device may compare a signal amplified in an amplifier with respective threshold values differently set in two comparators, and then determine the strength of light according to the comparison data. Additionally, a mobile device may convert a signal of amplified light into a digital signal through an Analog Digital Convertor (ADC), compare the digital signal with a given reference value, and then determine the strength of light by means of comparison data. Here, similar to a threshold value set in each comparator, a reference value may be a particular voltage value to be used for comparison with an amplified signal. When a function of playing musical instruments is executed, a mobile device may perform signal processing for light detected through a proximity sensor and, based on the strength of light, output pre-established song data or volume-adjusted song data. Here, pre-established song data may be differently established according to frequencies.

Meanwhile, in the second mode of data output based on the direction of a user's gesture, a mobile device may verify the time when light is detected through a plurality of receiving units, and then determine the direction of a user's gesture by using a difference in detection time of the receiving units. More specifically, based on the order of light detected in the receiving units, a mobile device may determine the direction of a user's gesture. When a function of playing musical instruments is executed, a mobile device may perform signal processing for light detected through a proximity sensor and then, based on the direction of a user's gesture, output timbre-adjusted song data. Here, a mobile device may determine up and down directions, right and left directions, or four directions according to the locations of the receiving units and the numbers of receiving units. For example, when two receiving units are located to the right and left sides or the upper and lower sides of an emitting unit, a mobile device may determine the direction of a user's gesture in up and down directions or in right and left directions. Also, when four receiving units are respectively located to four sides of an emitting unit, a mobile device may determine the direction of a user's gesture in four directions. Additionally, in order to determine the direction of a user's gesture, a mobile device may use a difference of the time when comparison data is delivered from two comparators after a comparison with the comparators threshold values.

A mobile device having a proximity sensor according to an exemplary embodiment of the present invention may include, but is not limited thereto, a variety of devices, such as a mobile communication device, a Personal Digital Assistant (PDA), an International Mobile Telecommunication 2000 (IMT-2000) device, a smart phone, a Portable Multimedia Player (PMP), an MP3 player, a navigation device, a notebook, and the like.

Figure 1:
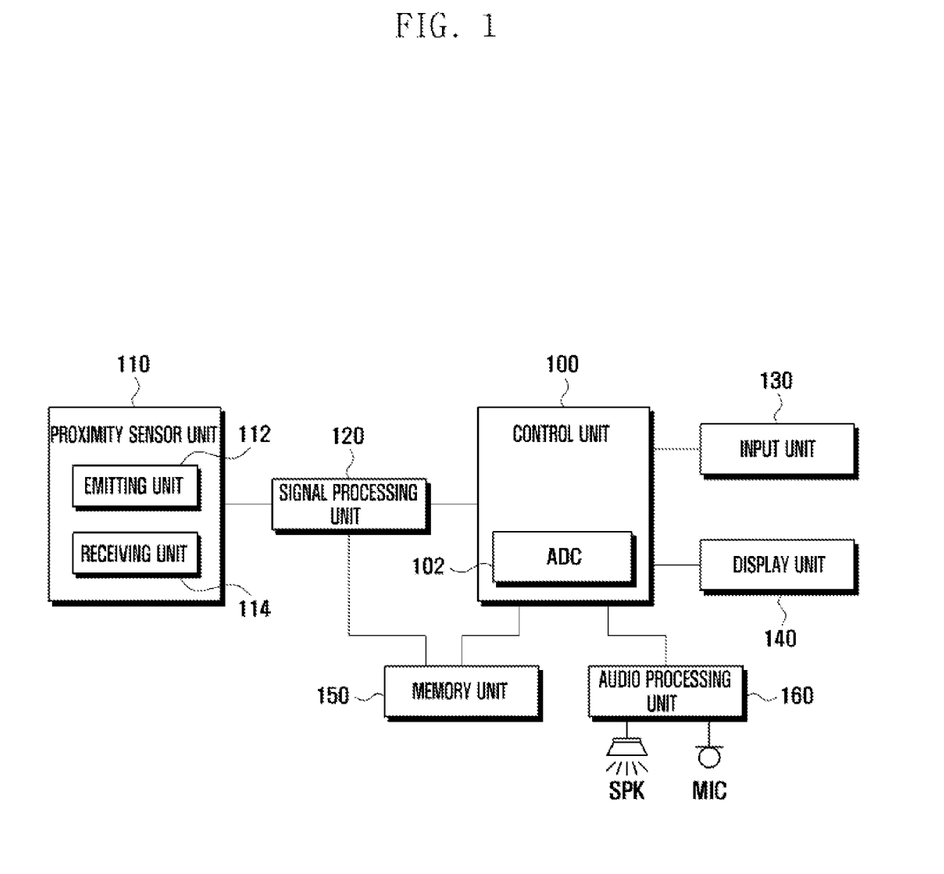
FIG. 1 is a block diagram illustrating a configuration of a mobile device according to an exemplary embodiment of the present invention.

FIG. 1 is a block diagram illustrating a configuration of a mobile device according to an exemplary embodiment of the present invention.

Referring to FIG. 1, the mobile device includes a control unit 100, a proximity sensor unit 110, a signal processing unit 120, an input unit 130, a display unit 140, a memory unit 150, and an audio processing unit 160. More particularly, the proximity sensor unit 110 includes an emitting unit 112 and a receiving unit 114.

The proximity sensor unit 110 emits light, detects a physical signal such as a user's gesture or a motion of an object input from the outside, and transmits a detected signal to the signal processing unit 120. Here, the proximity sensor unit 110 may employ an InfraRed (IR) sensor which detects an external object approach into a detection area with a given range by means of IR light. In this case, the proximity sensor unit 110 may have the emitting unit 112 formed of an IR Light Emitting Diode (LED) which emits IR light, and the receiving unit 114 formed of a detector such as a diode or a transistor which receives reflected light.

More specifically, the emitting unit 112 emits light outwardly in order to measure an approaching distance of an external object under the control of the control unit 100. The receiving unit 114 detects light reflected from an external object by means of a suitable detector. More particularly, in an exemplary embodiment of the present invention, the emitting unit 112 emits a given amount of light based on electric power amplified through the signal processing unit 120. Additionally, the receiving unit 114 transmits a signal corresponding to light detected through the detector to the signal processing unit 120. In an exemplary implementation, the proximity sensor unit 110 may include two receiving units in order to detect a gesture or a motion in up and down directions or in right and left directions. Alternatively, the proximity sensor unit 110 may include four receiving units for detection in four directions.

The signal processing unit 120 amplifies a signal generated in the proximity sensor unit 110 and compares an amplified signal with a threshold value in a comparator. Also, the signal processing unit 120 may amplify electric power according to a clock signal generated in the control unit 100. The signal processing unit 120 may include an amplifier for amplifying a signal of light detected by the receiving unit 114, and a comparator for comparing a signal delivered from the amplifier with a threshold value previously set therein. The amplifier may include, but not limited to, a transistor, an OPerational AMPlifier (OP AMP) and any other device capable of amplifying electric signals. The comparator outputs the result of the comparison between a signal amplified in the amplifier and a given threshold value therein. Meanwhile, when amplifying electric power under the control of the control unit 100, the signal processing unit 120 delivers amplified electric power to the emitting unit 112 to emit light corresponding to electric power. The signal processing unit 120 will be described in more detail below with reference to FIG. 2.

The input unit 130 includes a plurality of normal input keys configured to receive inputs of letters and numbers and special function keys configured to receive particular instructions. The input unit 130 provides various input signals in association with user's instructions and delivers the input signals to the control unit 100. More particularly, the input unit 130 may have at least one of a keypad and a touchpad. Also, the input unit 130, together with the display unit 140, may be formed of a touch screen which functions as an input unit and a display unit.

The display unit 140 represents a variety of information on a screen in association with an operation of the mobile device. Also, the display unit 140 displays on a screen suitable menu items, user's input data, and any other graphical elements. The display unit 140 may be formed of a Liquid Crystal Display (LCD), an Organic Light Emitting Device (OLED), and the like. In a case where a touch screen is used, the display unit 140 may correspond to a display unit of the touch screen.

The memory unit 150 stores a variety of applications and data required for operations of the mobile device. The memory unit 150 includes a program region and a data region. The program region may store an Operating System (OS) for booting the mobile device, a program for comparing a signal amplified in the amplifier with a given reference value, a program for verifying delivery time of comparison data, a program for outputting data according to the strength of light by using comparison data, and a program for determining the direction of a user's gesture according to the order of light detection in the receiving units 114, and thereby for outputting data. The data region may store data provided while the mobile device is used, such as comparison data provided by the comparison between an amplified signal of light received through the receiving units 114 and a given threshold value in the comparator, and provided by the comparison between an amplified signal and a given reference value.

The audio processing unit 160 receives audio signals from the control unit 100 and then outputs audible sounds through a SPeaKer (SPK), or receives audio signals from a MICrophone (MIC) and then outputs audio data to the control unit 100. Namely, the audio processing unit 160 converts digital audio signals input from the control unit 100 into analog audio signals to be output through the SPK. The audio processing unit 160 also converts analog audio signals input from the MIC into digital audio signals. More particularly, in a function of playing musical instruments, the audio processing unit 160 outputs different audio signals of song data according to the strength of light and the direction of a user's gesture under the control of the control unit 100.

The control unit 100 controls entire operations of the mobile device and a flow of signals between internal blocks in the mobile device. In an exemplary implementation, the control unit 100 may include an ADC 102 used to convert analog signals into digital signals. More particularly, the control unit 100 may control the proximity sensor unit 110 to enable a proximity sensing mode at a user's request. Here, a proximity sensing mode may be a mode to output data according to the strength of light or a mode to output data according to a gesture direction determined from a difference of the input time of a user's gesture detected through the receiving units 114. When the proximity sensing mode is enabled, the control unit 100 controls the emitting unit 112 to emit light by supplying electric power to the emitting unit 112.

Additionally, the control unit 100 may compare a signal amplified in the signal processing unit 120 with a given threshold value in a specific comparator and then distinctively output data according to comparison data. Also, the control unit 100 may control the ADC 102 to convert a signal amplified in the signal processing unit 120 into a digital signal. Here, a converted signal may be used to provide comparison data through a comparison with a given reference value. More specifically, the control unit 100 may control the ADC 102 to convert a received analog signal into a digital signal, and then compare a converted signal with a given reference value.

The control unit 100 may determine the strength of light according to comparison data and may output data distinguished based on the strength of light. For example, in a function of playing musical instruments, the control unit 100 may determine the strength of light in correspondence with the distance from the proximity sensor unit 110 to a user's gesture. Here, the control unit 100 may detect a greater amount of light when a user's gesture occurs at a shorter distance from the proximity sensor unit 110. Normally the emitting unit 112 emits a uniform quantity of light. Therefore, as an object reflecting light becomes more distant from the proximity sensor unit 110, the quantity of light received in the receiving unit 114 is decreased due to several causes such as scattering of light. After determining the strength of light reflected by a user's gesture, the control unit 100 adjusts a volume of sound based on the determined strength of light and then outputs song data with an adjusted volume.

If the proximity sensor unit 110 has a plurality of receiving units 114, the control unit 100 may determine a difference of the time when each receiving unit 114 detects light, namely, when the voltage of a light signal is at a peak. The control unit 110 determines the direction of a user's gesture by using the time difference and thereby outputs data. Also, the mobile device may verify the time when comparison data is delivered from two comparators after a comparison with their threshold values. Here, the mobile device may use a difference of the delivery time of comparison data in order to determine the direction of the user's gesture. The control unit 100 determines that the user's gesture is made from one receiving unit firstly detecting light to another receiving unit lastly detecting light. For example, in a function of playing musical instruments, the control unit 100 may adjust the timbre of song data according to the direction of the user's gesture and then output timbre-adjusted song data. Here, the control unit 100 may adjust the timbre of song data to a low-pitched tone when the user's gesture has a downward direction, and also may adjust the timbre of song data to a high-pitched tone when the user's gesture has an upward direction.

Furthermore, according to an exemplary embodiment of the present invention, the mobile device may enable both a mode to output data according to the strength of light and a mode to output data together according to the direction of a user's gesture.

Figure 2:
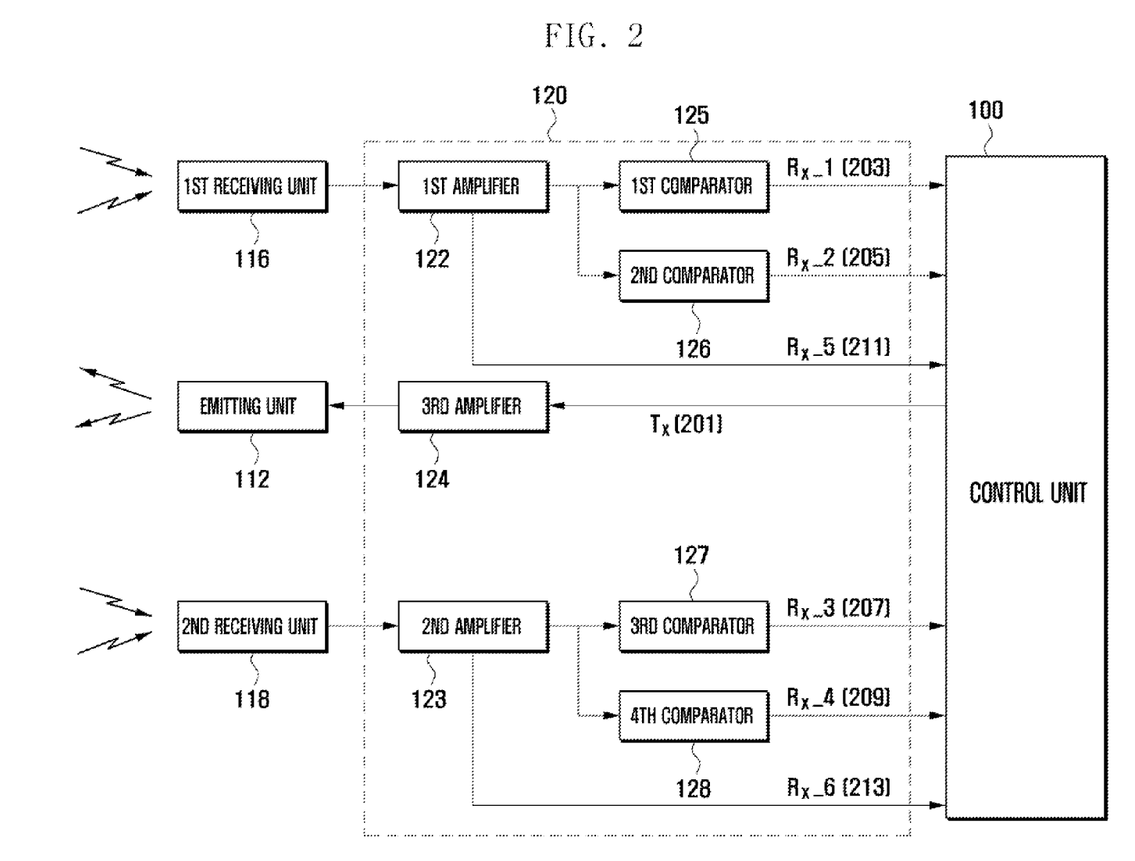
FIG. 2 is a block diagram illustrating a configuration of a signal processing unit of a mobile device according to an exemplary embodiment of the present invention.

FIG. 2 is a block diagram illustrating a configuration of a signal processing unit of a mobile device according to an exemplary embodiment of the present invention.

Referring to FIG. 2, the signal processing unit 120 may include a first amplifier 122, a second amplifier 123, a third amplifier 124, a first comparator 125, a second comparator 126, a third comparator 127, and a fourth comparator 128. More particularly, if the proximity sensor unit 110 of the mobile device has two or more receiving units, signals of light detected by the respective receiving units may be transmitted to and amplified in different amplifiers. When the receiving unit 114 as illustrated in FIG. 1 includes the first receiving unit 116 and the second receiving unit 118, the first receiving unit 116 detects light reflected by a user's gesture and transmits a signal of reflected light to the first amplifier 122. Then the first amplifier 122 amplifies a received signal and transmits the amplified signal to the first comparator 125 and the second comparator 126. Here, each comparator performs a comparison between a given threshold value and an amplified signal. Thereby, the comparator provides comparison data. Also, the first amplifier 122 may transmit an amplified signal to the control unit 100. Here, the control unit 100 performs a comparison between a given reference value and an amplified signal. Thereby, the control unit 100 provides comparison data.

Additionally, the second receiving unit 118 detects light reflected by a user's gesture and transmits a signal of reflected light to the second amplifier 123. Then the second amplifier 123 amplifies a received signal and transmits the amplified signal to the third comparator 127 and the fourth comparator 128. Here, each comparator performs a comparison between a given threshold value and an amplified signal. Thereby, each comparator provides comparison data. Also, the second amplifier 123 may transmit the amplified signal to the control unit 100. Here, the control unit 100 performs a comparison between a given reference value and an amplified signal. Thereby, the control unit 100 provides comparison data.

The third amplifier 124 receives a Transmit (Tx) signal 201 from the control unit 100 when a proximity sensing mode is enabled, and then may amplify electric power. Here, the control unit 100 may transmit a limited electric current in order to reduce power consumption of the mobile device. The third amplifier 124 transmits amplified electric power to the emitting unit 112, which emits light based on the amplified electric power.

In order to distinctively output data according to the strength of light, the first receiving unit 116 detects light reflected by the user's gesture and delivers a corresponding signal to the first amplifier 122. At this time, since a delivered signal has a small amplitude, the first amplifier 122 amplifies a signal and transmits the amplified signal to the first comparator 125 and the second comparator 126. The first comparator 125 compares an amplified signal with the first threshold value, provides comparison data, and transmits a Received (Rx)_1 signal 203 corresponding to the comparison data to the control unit 100. Similarly, the second comparator 126 compares an amplified signal with the second threshold value, provides the comparison data, and transmits an Rx_2 signal 205 corresponding to the comparison data to the control unit 100. The control unit 100 analyzes received signals Rx_1 and Rx_2. Thereby, based on the strength of light detected by the first receiving unit 116, the control unit 100 distinctively outputs data. Here, the control unit 100 may verify the time when comparison data is received from each of the first comparator 125 and the second comparator 126. Thereafter, in order to determine direction of the user's gesture, the time may be input to a subtraction operation with another time when comparison data is received from the third comparator 127 and the fourth comparator 128.

Additionally, the second receiving unit 118 detects light reflected by the user's gesture and then delivers a corresponding signal to the second amplifier 123. At this time, the second amplifier 123 amplifies a signal and transmits the amplified signal to the third comparator 127 and the fourth comparator 128. The third comparator 127 compares an amplified signal with the third threshold value, provides comparison data, and transmits an Rx_3 signal 207 corresponding to the comparison data to the control unit 100. Similarly, the fourth comparator 128 compares the amplified signal with the fourth threshold value, provides the comparison data, and transmits an Rx_4 signal 209 corresponding to the comparison data to the control unit 100. The control unit 100 analyzes the received signals Rx_3 and Rx_4. Thereby, based on the strength of light detected by the second receiving unit 118, the control unit 100 distinctively outputs data. Here, the control unit 100 may verify the time when the comparison data is received from each of the third comparator 127 and the fourth comparator 128. Thereafter, in order to determine the direction of the user's gesture, the time may be input to a subtraction operation with another time when comparison data is received from the first comparator 125 and the second comparator 126.

Also, the first amplifier 122 amplifies a signal delivered from the first receiving unit 116 and transmits an amplified signal Rx_5 211 to the control unit 100. The amplified signal Rx_5 211 is converted into a digital signal through the ADC 102 and used to provide comparison data by being compared with a first reference value. Similarly, the second amplifier 123 amplifies a signal delivered from the second receiving unit 118 and transmits an amplified signal Rx_6 213 to the control unit 100. The amplified signal Rx_6 213 is converted into a digital signal through the ADC 102 and used to provide comparison data by being compared with a second reference value. Here, the first reference value and the second reference value set in the control unit 100 are certain values to be used for comparison with an amplified signal, similar to the above described threshold values set in the respective comparators. The values may be set in advance during manufacture of a mobile device.

Furthermore, the control unit 100 analyzes signals Rx_5 211 and Rx_6 213 received from the first amplifier 122 and the second amplifier 123 and then determines a difference of the detection time of light by the first receiving unit 116 and the second receiving unit 118. Through the process, the control unit 100 distinctively outputs data based on which one of the first receiving unit 116 and the second receiving unit 118 detects the light first. Namely, the control unit 100 determines the order of the light detected by performing a subtraction operation for the time when a peak is detected in the voltage of signals Rx_5 211 and Rx_6 213 delivered from the first amplifier 122 and the second amplifier 123.

Figure 3:
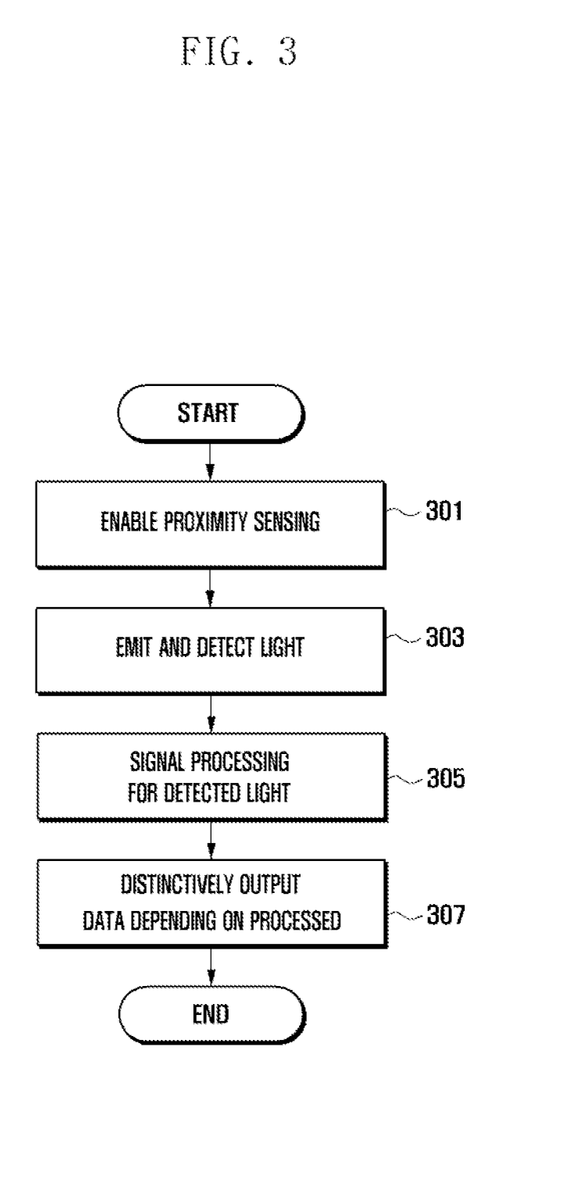
FIG. 3 is a flow diagram illustrating a method for outputting data of a mobile device using a proximity sensor according to an exemplary embodiment of the present invention.
Figure 4A:
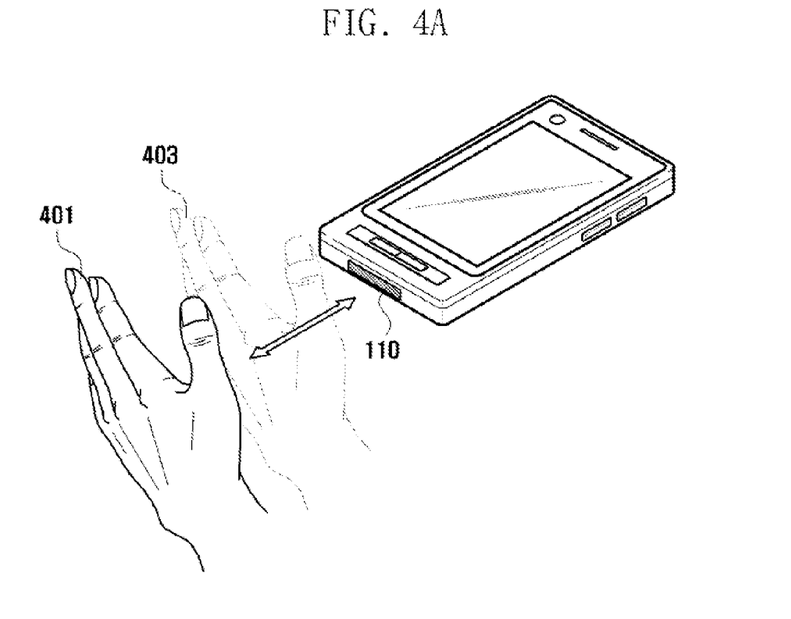
FIGS. 4A to 4C are example views illustrating gestures input to a mobile device according to exemplary embodiments of the present invention.
Figure 4B:
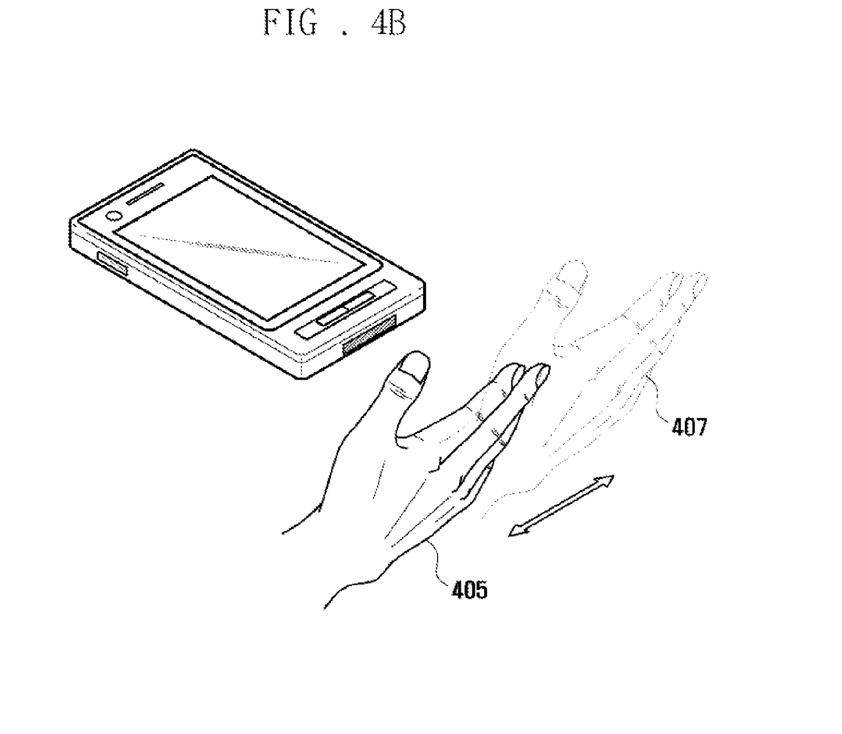
Figure 4C:
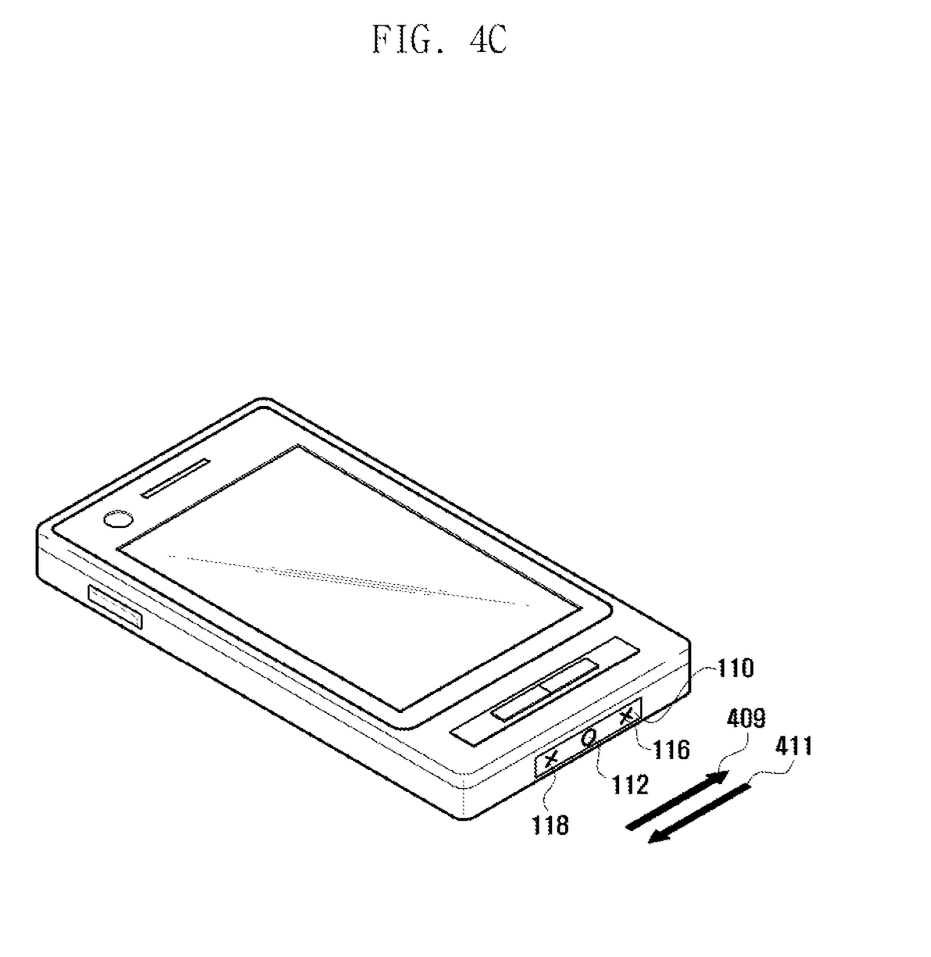

FIG. 3 is a flow diagram illustrating a method for outputting data of a mobile device using a proximity sensor according to an exemplary embodiment of the present invention. FIGS. 4A to 4C are example views illustrating gestures input to a mobile device according to exemplary embodiments of the present invention.

Referring to FIGS. 3 to 4C, the mobile device enables a proximity sensing mode at a user's request in step 301. In the proximity sensing mode, the mobile device distinctively outputs data based on the strength of light and direction of a user's gesture. Here, the proximity sensing mode may include a first data output mode based on the strength of light based on distance to the user's gesture, and a second data output mode based on the direction of the user's gesture obtained by determining a difference of the input time of the user's gesture detected through receiving units. When the proximity sensing mode is enabled, the mobile device activates both modes together and controls to detect the user's gesture.

Next, the mobile device amplifies electric power through an amplifier in a control unit 100 and emits light through an emitting unit 112 based on amplified electric power in step 303. Here, the emitting unit 112 continues to emit light until the control unit 100 stops supplying electric power. Additionally, the receiving unit 114 detects light in step 303. In order to improve performance of the receiving unit and effectively detect the user's gesture, two or more receiving units may be employed.

When light is detected, the mobile device performs signal processing for the detected light in step 305. The signal processing may be performed in a signal processing unit 120, and a processed signal may be delivered to the control unit 100. Here, an amplifier in the signal processing unit 120 may amplify a signal received from the receiving unit 114. The signal processing unit 120 transmits an amplified signal to a comparator to compare the amplified signal with a given threshold value. Two comparators with different threshold values may be used together. Thereafter, the signal processing unit 120 delivers a signal corresponding to the comparison data provided by the comparator to the control unit 100. Also, the signal processing unit 120 delivers a signal amplified in the amplifier to the control unit 100. Here, the control unit 100 controls the ADC 102 to convert a received signal into a digital signal, and performs a comparison between the converted signal and a given reference value. The control unit 100 receives the amplified signal directly from the amplifier without passing the comparator, and provides comparison data by comparing the received signal with a reference value stored in the memory unit 150.

After the signal processing, the control unit 100 analyzes the signal received from the signal processing unit 120 and then distinctively outputs data based on the result of the analysis in step 307. Through the analysis of the signal, the control unit 100 determines the strength of light and direction of the user's gesture. For example, as illustrated in FIG. 4A, the mobile device detects a greater amount of light when the user's gesture occurs at a near location 403 than at a distant location 401. Therefore, when outputting song data, the mobile device increases the sound volume of song data when the user's gesture occurs at the near location 403 than at the distant location 401.

Additionally, the control unit 100 verifies the time when the receiving units detect light reflected by the user's gesture, and distinctively outputs data based on a difference of the time. Here, the control unit 100 determines the direction of the user's gesture according to a location of the receiving unit detecting light. The control unit 100 verifies the time when a peak voltage is detected in the amplified signal, and determines the direction of the user's gesture by using a difference of the detection time of the peak voltage. For example, as illustrated in FIG. 4B, the mobile device performs a subtraction operation for the detection time of the signals corresponding to light input into the receiving units. Thereby, the mobile device determines the direction of the user's gesture. Based on the direction of the user's gesture, the control unit 100 adjusts a timbre of song data. More specifically, the control unit 100 adjusts the timbre of song data to a low-pitched tone when a user's gesture has a downward direction from an upper location 407 to a lower location 405, and also adjusts the timbre of song data to a high-pitched tone when the user's gesture has an upward direction from the lower location 405 to the upper location 407.

Referring to FIG. 4C, the proximity sensor unit 110 of the mobile device may include an emitting unit 112, a first receiving unit 116 and a second receiving unit 118. While the emitting unit 112 emits light, the first receiving unit 116 and the second receiving unit 118 detect light respectively. Here, the control unit 100 determines a difference of the time when each receiving unit detects a peak voltage in a received signal. For example, if the second receiving unit 118 detects light earlier than the first receiving unit 116, the control unit 100 determines that the user's gesture has an upward direction 409. Thereby, the control unit 100 adjusts the timbre of song data to a high-pitched tone. Similarly, if the first receiving unit 116 detects light earlier than the second receiving unit 118, the control unit 100 determines that the user's gesture has a downward direction 411. Thereby, the control unit 100 adjusts the timbre of song data to a low-pitched tone.

Figure 5A:
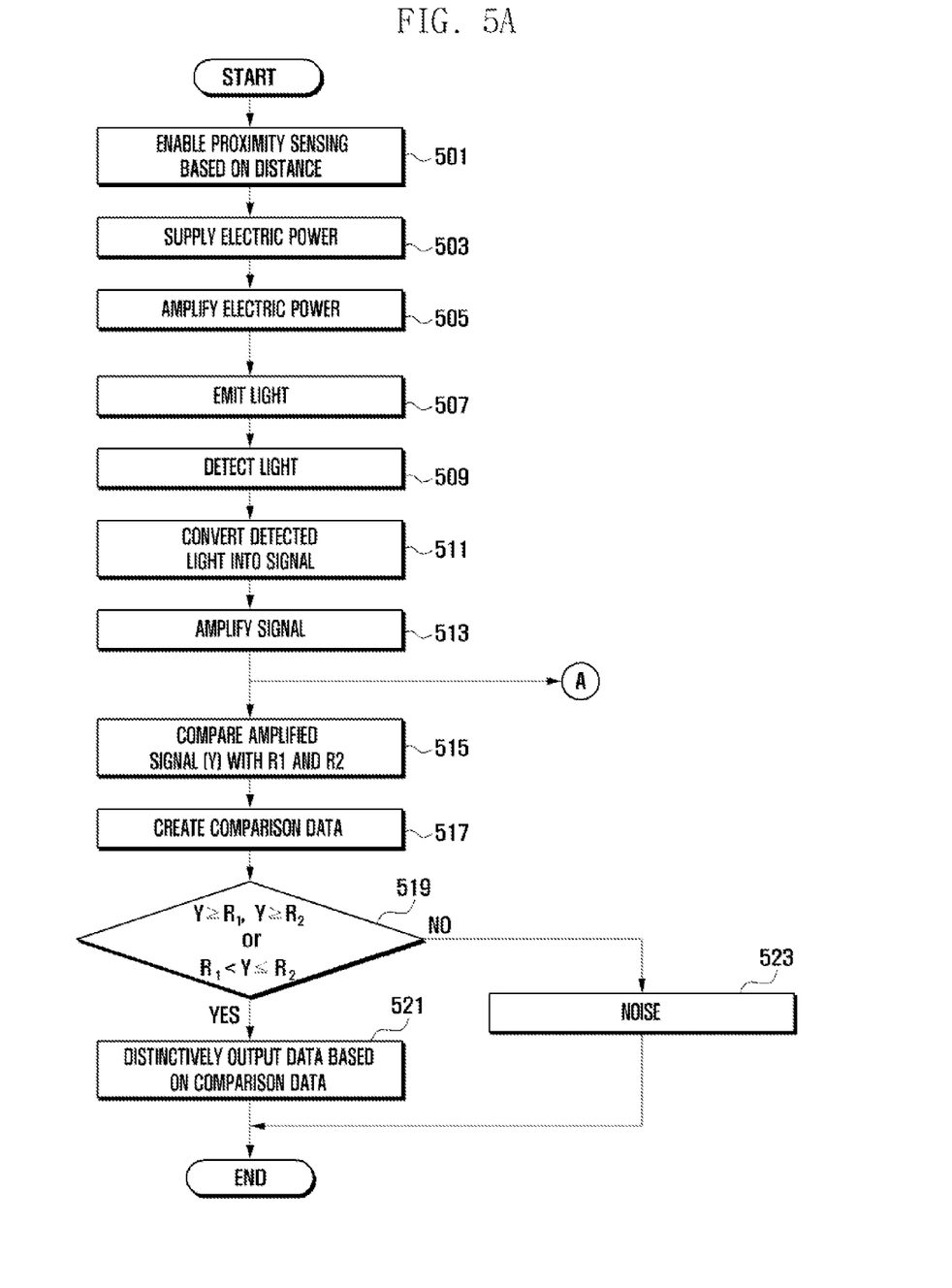
FIGS. 5A and 5B are flow diagrams illustrating a data output method based on the strength of light according to exemplary embodiments of the present invention.
Figure 5B:
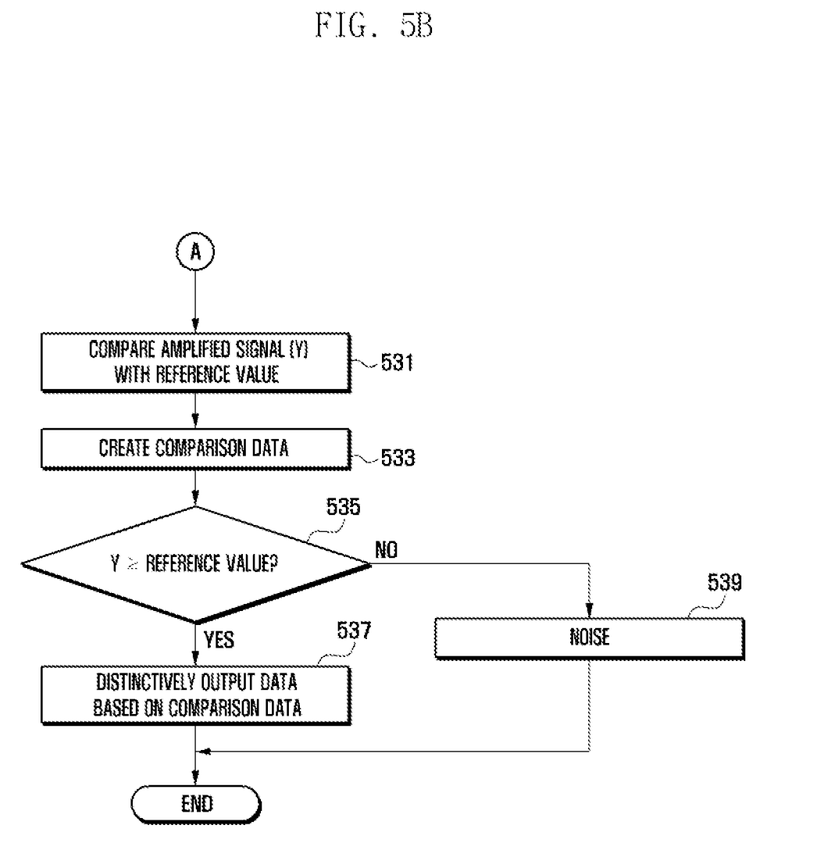

FIGS. 5A and 5B are flow diagrams illustrating a data output method based on the strength of light according to exemplary embodiments of the present invention.

Referring to FIG. 5A, the control unit 100 enables a proximity sensing mode based on a distance to a user's gesture to be input in step 501. In the proximity sensing mode, the control unit 100 transmits a signal to an amplifier therein so that the amplifier may supply electric power to an emitting unit 112 in step 503. Here, the emitting unit 112 may be formed of an IR LED. The amplifier receiving a signal from the control unit 100 amplifies electric power and supplies the amplified electric power to the emitting unit 112 in step 505.

The emitting unit 112 supplied with electric power emits light in step 507. Here, the emitting unit 112 continues to emit light until the control unit 100 stops supplying electric power. More specifically, the emitting unit 112 may continue to emit light, whether the receiving unit 114 detects light or not.

While light is emitted, the receiving unit 114 detects reflected light in step 509. Here, the receiving unit 114 may include a first receiving unit 116 and a second receiving unit 118. The receiving unit 114 converts detected light into an electric signal and delivers the electric signal to a signal processing unit 120 in step 511.

The signal processing unit 120 amplifies the received signal through the amplifier equipped therein in step 513. The signal processing unit 120 then transmits an amplified signal to comparators equipped therein.

Using the comparators, the signal processing unit 120 compares the amplified signal (Y) with given threshold values (R1, R2) set in the respective comparators in step 515. Here, the mobile device may use two or more comparators with different threshold values. More specifically, a first comparator 125 compares an amplified signal (Y) with the first preset threshold value (R1), and a second comparator 126 compares the amplified signal (Y) with the preset second threshold value (R2). Accordingly, the signal processing unit 120 provides comparison data and delivers the comparison data to the control unit 100 in step 517.

The following Table 1 shows an example of the comparison of the amplified signals with threshold values.

TABLE 1

|  | Rx_11 | Rx_12 |  |
|---|---|---|---|
| Y = 10 mV | 0 | 0 | 00 [Noise] |
| Y = 100 mV | 1 | 0 | 10 |
| Y = 200 mV | 1 | 1 | 11 |

For example, the first threshold value (R1) of the first comparator 125 may be set to 50 mV, and the second threshold value (R2) of the second comparator 126 may be set to 150 mV. That is, the second threshold value (R2) is greater than the first threshold value (R1). If an amplified signal (Y) is greater than or equal to one of the threshold values (R1, R2), each of the comparator 125 126 provides comparison data '1'. Also, if the amplified signal (Y) is smaller than one of the threshold values (R1, R2), each of the comparators 125, 126 provides comparison data '0'.

In Table 1, an Rx_11 signal corresponds to comparison data provided by a comparison between the amplified signal (Y) and the first threshold value (R1) of the first comparator 125. Similarly, an Rx_12 signal corresponds to comparison data provided by a comparison between the amplified signal (Y) and the second threshold value (R2) of the second comparator 126. If the amplified signal (Y) is 10 mV, the amplified signal (Y) is smaller than the first threshold value (R1). Therefore, the first comparator 125 provides comparison data '0'. Also, the second comparator 126 provides comparison data '0' since the amplified signal (Y) is smaller than the second threshold value (R2). The first comparator 125 then transmits the Rx_11 signal corresponding to comparison data '0' to the control unit 100, and the second comparator 126 transmits the Rx_12 signal corresponding to comparison data '0' to the control unit 100.

When signals corresponding to the comparison data are received, the control unit 100 analyzes the received signals in step 519. If the amplified signal (Y) is greater than or equal to the threshold values (R1, R2), or if the amplified signal (Y) is greater than the first threshold value (R1) and smaller than or equal to the second threshold value (R2), the control unit 100 regards the user's gesture as normal and thereby distinctively outputs data based on the comparison data in step 521. More specifically, if the amplified signal (Y) is greater than or equal to at least one of the threshold values (R1, R2), the control unit 100 recognizes the user's gesture as normal. For example, in a case of executing a function of playing musical instruments, the control unit 100 determines that the strength of light is greater when the user's gesture is input at a near location from the proximity sensor unit 110 than at a distant location. Therefore, the control unit 100 increases a sound volume and outputs song data with increased volume when the user's gesture occurs at the near location from the proximity sensor unit 110.

Meanwhile, if the amplified signal (Y) is smaller than both of the threshold values (R1, R2), the control unit 100 recognizes the comparison data as noise in step 523.

Referring to FIG. 5B, in a process of distinctively outputting data based on the strength of light, the control unit 100 may directly receive a signal amplified in the amplifier. More specifically, the control unit 100 may receive an amplified signal from a signal processing unit 120. If receiving an amplified signal, the control unit 100 controls an ADC 102 to convert the amplified signal into a digital signal.

The control unit 100 compares the converted signal with a given reference value in step 531. Similar to the above described threshold value set in the comparator, the reference value may be used to provide comparison data. Thereafter, the control unit 100 provides comparison data from a comparison between the received signal, i.e., the converted signal, and a reference value in step 533.

After providing the comparison data, the control unit 100 analyzes the comparison data in step 535. Here, the control unit 100 determines whether the converted signal is greater than or equal to a given reference value. If it is determined that the converted signal is greater than or equal to the given reference value, the control unit 100 distinctively outputs song data based on the analyzed data in step 537. The control unit 100 determines the strength of light according to the analyzed data and thereby outputs song data by adjusting the sound volume. Meanwhile, if it is determined that the converted signal is smaller than the given reference value, the control unit 100 determines that noise is input in step 539.

Figure 6A:
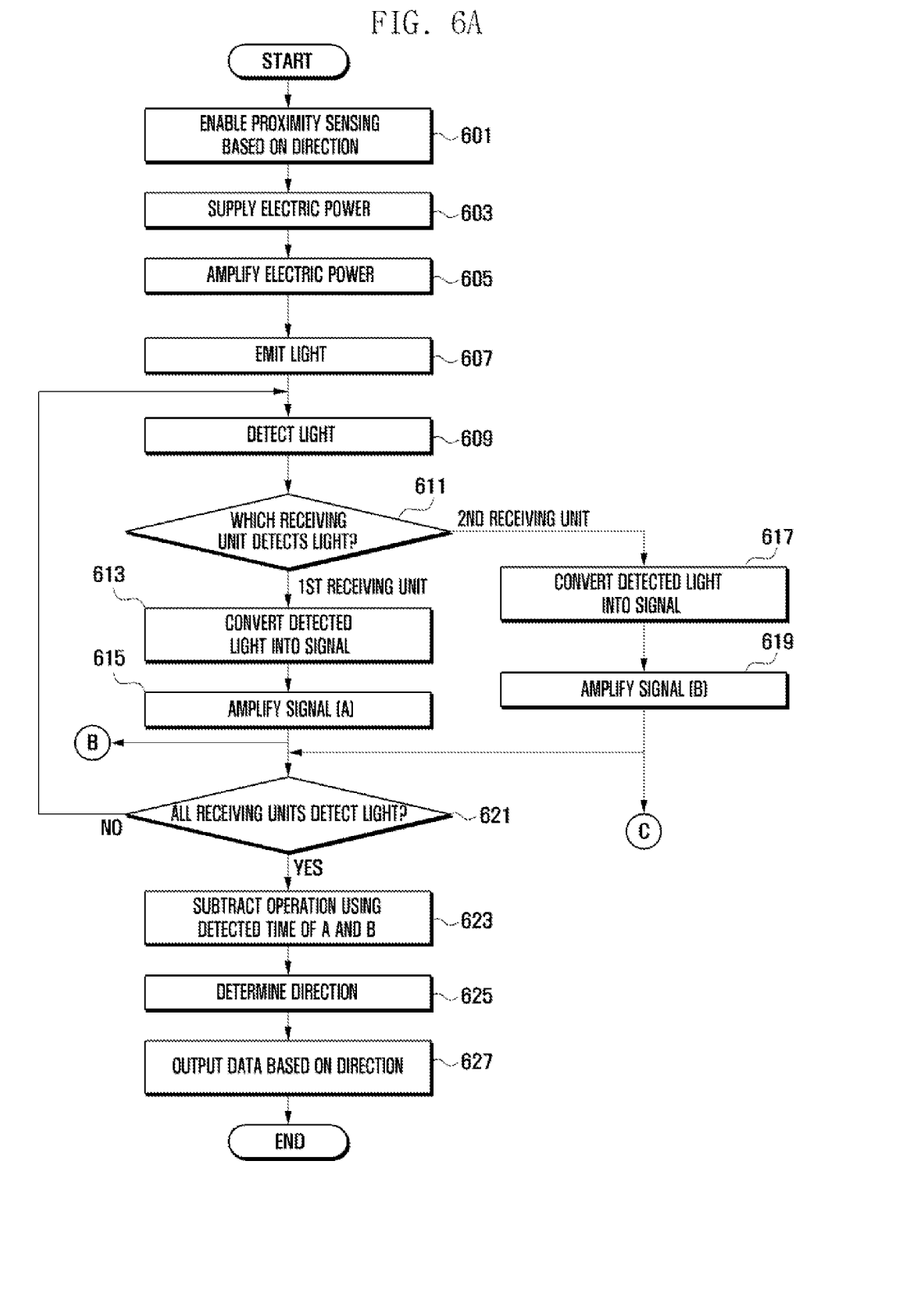
FIGS. 6A and 6B are flow diagrams illustrating a data output method based on a direction of a gesture according to exemplary embodiments of the present invention.
Figure 6B:
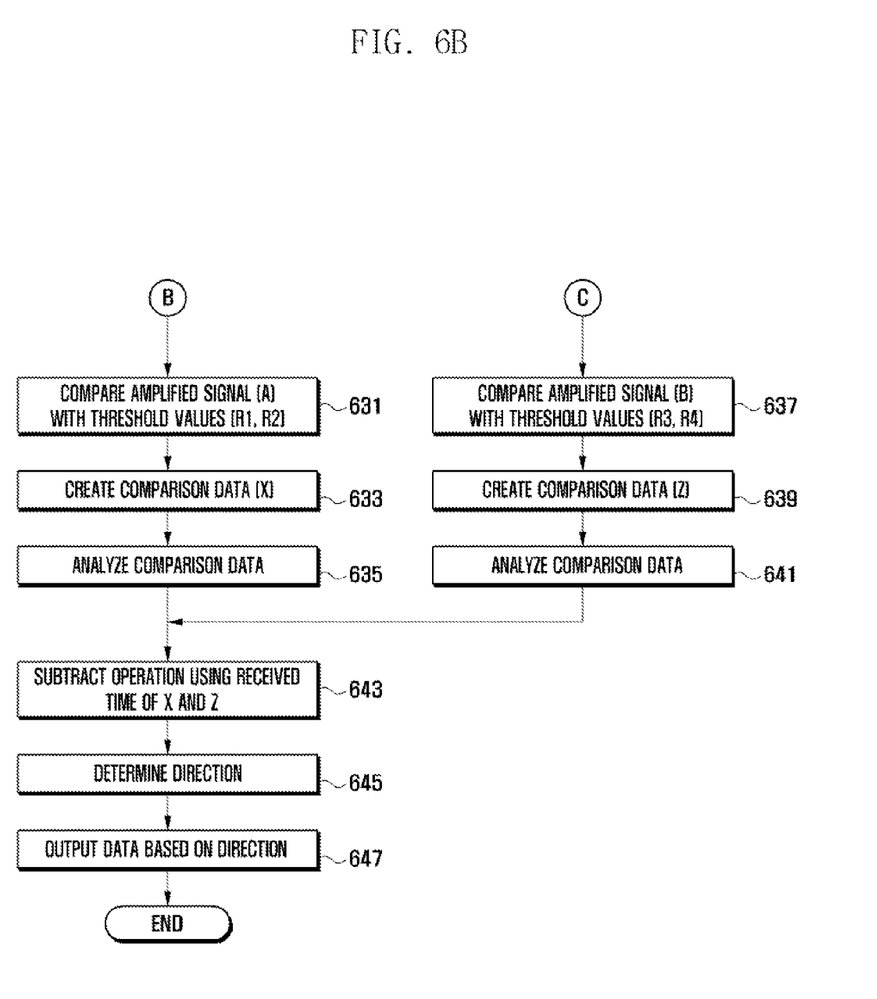

FIGS. 6A and 6B are flow diagrams illustrating a data output method based on direction of gesture according to exemplary embodiments of the present invention.

Referring to FIG. 6A, the control unit 100 enables a proximity sensing mode based on direction of a user's gesture in step 601. In the proximity sensing mode, the control unit 100 transmits a signal to an amplifier therein so that the amplifier may supply electric power to an emitting unit 112 in step 603. Here, the emitting unit 112 may be formed of an IR LED. The amplifier receiving a signal from the control unit 100 amplifies electric power and supplies the amplified electric power to the emitting unit 112 in step 605.

The emitting unit 112 supplied with electric power emits light in step 607. Here, the emitting unit 112 continues to emit light until the control unit 100 stops supplying electric power.

While light is emitted, the receiving unit 114 detects reflected light in step 609. Here, the receiving unit 114 may include a first receiving unit 116 and a second receiving unit 118. The control unit 100 determines which of the receiving units detects light in step 611. More specifically, if the proximity sensor unit 110 has two or more receiving units, the control unit 100 determines a specific one of the receiving units by receiving a signal from the specific receiving unit which detects light.

When light is detected, the first receiving unit 116 converts the detected light into an electric signal and transmits the electric signal to the signal processing unit 120 in step 613. The signal processing unit 120 amplifies the received signal through the amplifier equipped therein and transmits the amplified signal (A) to the control unit 100 in step 615. On the other hand, the second receiving unit 118 converts the detected light into an electric signal and transmits the electrical signal to the signal processing unit 120 in step 617. The signal processing unit 120 amplifies the received signal through the amplifier equipped therein and transmits the amplified signal (B) to the control unit 100 in step 619.

The control unit 100 determines whether all of the receiving units detect light in step 621. If all receiving units detect light, the control unit 100 performs a subtraction operation by using the time when a peak voltage is detected in each amplified signal (A, B) in step 623.

The control unit 100 may determine direction of a user's gesture by means of the subtraction operation in step 625. For example, if the detection time of the peak voltage in the signal (A) amplified in the first amplifier 122 is faster than in the signal (B) amplified in the second amplifier 124, the control unit 100 determines that the first receiving unit 116 detects light earlier than the second receiving unit 118. On the contrary, if the detection time of the peak voltage in the signal (B) amplified in the second amplifier 124 is faster than in the signal (A) amplified in the first amplifier 122, the control unit 100 determines that the second receiving unit 118 detects light earlier than the first receiving unit 116.

Based on the direction of a user's gesture, the control unit 100 outputs data in step 627. For example, in a case of executing a function of playing musical instruments, the control unit 100 adjusts a timbre of song data according to the direction of a user's gesture. More specifically, the control unit 100 adjusts the timbre of song data to a low-pitched tone when a user's gesture has a downward direction, and also adjusts the timbre of song data to a high-pitched tone when a user's gesture has an upward direction. For example, the first receiving unit 116 may be located at an upper position than the second receiving unit 118. If the first receiving unit 116 detects the peak voltage in a signal of light before the second receiving unit 118, the control unit 100 determines that a user's gesture has a downward direction and adjusts the timbre of song data to a low-pitched tone. However, if the second receiving unit 118 detects the peak voltage in a signal of light before the first receiving unit 116, the control unit 100 determines that the user's gesture has an upward direction and adjusts the timbre of song data to a high-pitched tone.

In contrast, if all the receiving units do not detect light in step 621, the process returns to step 609 and the proximity sensor unit 110 performs the subsequent steps.

Referring to FIG. 6B, in a process of distinctively outputting data based on the direction of the user's gesture, the control unit 100 may deliver a signal amplified in the amplifier to two or more comparators. Then each comparator compares an amplified signal with a given preset threshold value. In an exemplary implementation, the mobile device may include two receiving units, i.e., a first receiving unit 116 and a second receiving unit 118, and also a plurality of comparators, e.g., a first comparator 125, a second comparator 126, a third comparator 127 and a fourth comparator 128. Here, the first through fourth comparators 125, 126, 127 and 128 have preset threshold values R1, R2, R3 and R4, respectively.

When receiving an amplified signal (A), the first comparator 125 compares the amplified signal (A) with the first preset threshold value R1, and the second comparator 126 compares this amplified signal (A) with the second preset threshold value R2 in step 631. The comparators 125 and 126 provide comparison data (X) and transmit the comparison data (X) to the control unit 100 in step 633. Here, the provided comparison data (X) may be a plurality of comparison data.

When receiving the comparison data (X), the control unit 100 analyzes the received comparison data (X) in step 635. In this step, the control unit 100 may verify the time when the comparison data (X) is received.

Additionally, when receiving an amplified signal (B), the third comparator 127 compares the amplified signal (B) with the third preset threshold value R3, and the fourth comparator 128 compares the amplified signal (B) with the fourth preset threshold value R4 in step 637. The third comparator 127 and the fourth comparator 128 provide comparison data (Z) and transmit the comparison data (Z) to the control unit 100 in step 639. Here, the provided comparison data (Z) may be a plurality of comparison data.

When receiving the comparison data (Z), the control unit 100 analyzes the received comparison data (Z) in step 641. In this step, the control unit 100 may verify the time when the comparison data (Z) is received.

After verifying the received time of the comparison data, the control unit 100 performs a subtraction operation by using the received time of the comparison data (X, Z) in step 643.

When performing the subtraction operation, the control unit 100 may determine direction of the user's gesture in step 645. For example, if the received time of the comparison data (X) is faster than the received time of the comparison data (Z), the control unit 100 determines that the first receiving unit 116 detects light earlier than the second receiving unit 118. However, if the received time of the comparison data (Z) is faster than the received time of the comparison data (X), the control unit 100 determines that the second receiving unit 118 detects light earlier than the first receiving unit 116.

Based on the direction of a user's gesture, the control unit 100 outputs data in step 647.

As described above, in a proximity sensing method according to exemplary embodiments of the present invention, the mobile device may enable at the same time a mode to output data based on the strength of light and a mode to output data based on a gesture direction determined from a difference of input time of a user's gesture detected through receiving units.

According to exemplary embodiments of the present invention, in a function of playing musical instruments, the mobile device may determine the strength of light by performing signal processing for light detected through the proximity sensor unit. Therefore, the mobile device may output pre-established song data or volume-adjusted song data, based on the strength of light. Also, the mobile device can determine the direction of a user's gesture detected through the proximity sensor unit. Therefore, the mobile device can output timbre-adjusted song data based on the direction of a user's gesture.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for outputting an audio sound of a mobile device having a proximity sensor when executing a musical instrument playing function on the mobile device, the method comprising:
   emitting light and detecting light reflected responding to the emitted light;
   processing a signal of the detected light;
   comparing the processed signal with a preset value;
   providing comparison data based on the compared processed signal with the preset value;
   determining a strength of the detected light by using the comparison data; and
   outputting an audio sound corresponding to the strength of the detected light when executing the musical instrument playing function on the mobile device.

2. The method of claim 1, wherein the detecting of the light comprises detecting the reflected light by at least one of a plurality of receiving units.

3. The method of claim 1, wherein the preset value comprises at least one of threshold values respectively set in a plurality of comparators and a reference value set in a control unit.

4. The method of claim 1, wherein the processing of the signal comprises:
   amplifying the signal of the detected light; and
   transmitting the amplified signal to at least one of a plurality of comparators and a control unit.

5. The method of claim 4, wherein the comparing of the processed signal with the preset value comprises comparing the amplified signal with a preset threshold value set in each of the plurality of comparators.

6. The method of claim 5, wherein the outputting of the audio sound comprises distinctively outputting audio sound based on the strength of light when the amplified signal is greater than or equal to the preset threshold value of at least one of the plurality of comparators.

7. The method of claim 6, further comprising:
   recognizing the comparison data as noise when the amplified signal is smaller than the respective preset threshold values of the plurality of comparators.

8. The method of claim 4, wherein the comparing of the processed signal with the preset value comprises comparing the amplified signal with a preset reference value set in the control unit.

9. The method of claim 8, wherein the outputting of the audio sound comprises distinctively outputting audio sound based on the strength of light when the amplified signal is greater than or equal to the preset reference value.

10. The method of claim 9, further comprising:
recognizing the comparison data as noise when the amplified signal is smaller than the preset reference value.

11. The method of claim 1, wherein the outputting of the audio sound comprises outputting at least one of pre-established song data and volume-adjusted song data according to the strength of light determined based on a result of analyzing the comparison data.

12. The method of claim 2, wherein the processing of the signal comprises:
amplifying signals of the light detected by the plurality of receiving units; and
transmitting the amplified signals to at least one of a plurality of comparators and a control unit.

13. The method of claim 12, wherein the outputting of the audio sound comprises:
analyzing time when a peak voltage is detected in each of the amplified signals;
performing a subtraction operation using the analyzed time; and
determining direction of a gesture based on the subtraction operation result.

14. The method of claim 12, wherein the comparing of the processed signal with the preset value comprises comparing each of the amplified signals with a preset threshold value set in each of the plurality of comparators.

15. The method of claim 14, wherein the outputting of the audio sound comprises:
analyzing time when the comparison data is transmitted;
performing a subtraction operation using the analyzed time; and
determining one of up and down directions, and right and left directions of a gesture based on the subtraction operation result.

16. The method of claim 15, wherein the outputting of the audio sound comprises outputting timbre-adjusted song data according to the direction of the gesture.

17. A mobile device comprising:
a proximity sensor unit including an emitting unit for emitting light and at least one receiving unit for detecting light reflected responding to the emitted light when executing a musical instrument playing function on the mobile device;
a signal processing unit for processing a signal of the detected light, for providing comparison data by comparing the processed signal with a preset value and for determining a strength of the detected light by using the comparison data; and
a control unit for controlling an output of an audio sound corresponding to the strength of the detected light when executing the musical instrument playing function on the mobile device.

18. The mobile device of claim 17, wherein the proximity sensor unit comprises a plurality of receiving units, at least one of the receiving units detects the reflected light.

19. The mobile device of claim 17, wherein the preset value comprises at least one of threshold values respectively set in a plurality of comparators in the signal processing unit and a reference value set in the control unit.

20. The mobile device of claim 17, wherein the signal processing unit amplifies the signal of the detected light and transmits the amplified signal to at least one of a plurality of comparators equipped therein and the control unit.

21. The mobile device of claim 20, wherein the signal processing unit compares the amplified signal with the preset threshold value set in each of the plurality of comparators, and provides the comparison data to the control unit.

22. The mobile device of claim 21, wherein the control unit distinctively outputs the audio sound based on the strength of light when the amplified signal is greater than or equal to the preset threshold value of at least one of the plurality of comparators.

23. The mobile device of claim 22, wherein the control unit recognizes the comparison data as noise when the amplified signal is smaller than the respective preset threshold values of the plurality of comparators.

24. The mobile device of claim 20, wherein the control unit compares the amplified signal with the preset reference value set therein.

25. The mobile device of claim 24, wherein the control unit distinctively outputs the audio sound based on the strength of light when the amplified signal is greater than or equal to the preset reference value.

26. The mobile device of claim 25, wherein the control unit recognizes the comparison data as noise when the amplified signal is smaller than the preset reference value.

27. The mobile device of claim 17, wherein the control unit outputs at least one of pre-established song data and volume-adjusted song data according to the strength of light determined based on a result of analyzing the comparison data.

28. The mobile device of claim 18, wherein the signal processing unit amplifies signals of the light detected by the plurality of receiving units, and delivers the amplified signals to at least one of a plurality of comparators therein and the control unit.

29. The mobile device of claim 28, wherein the control unit analyzes the time when a peak voltage is detected in each of the delivered signals, performs a subtraction operation using the analyzed time, and determines direction of a gesture based on the subtraction operation result.

30. The mobile device of claim 28, wherein the signal processing unit compares each of the amplified signals with a preset threshold value set in each of the plurality of comparators.

31. The mobile device of claim 30, wherein the control unit analyzes the time when the comparison data is delivered, performs a subtraction operation using the analyzed time, and determines at least one of up and down directions and right and left directions of a gesture based on the subtraction operation result.

32. The mobile device of claim 29, wherein the control unit outputs timbre-adjusted song data according to the direction of the gesture.

* * * * *